April 22, 1924.  
W. S. BARNES  
ANIMAL TRAP  
Filed June 29, 1922  
1,491,457  
2 Sheets-Sheet 1

Inventor  
WILLIS S. BARNES  
By Hazard & Miller  
Attorneys.

April 22, 1924.                                                               1,491,457
W. S. BARNES
ANIMAL TRAP
Filed June 29, 1922          2 Sheets-Sheet 2

Inventor
WILLIS S. BARNES
BY Hazard & Miller
Attorneys.

Patented Apr. 22, 1924.

1,491,457

UNITED STATES PATENT OFFICE.

WILLIS S. BARNES, OF LOS ANGELES, CALIFORNIA.

ANIMAL TRAP.

Application filed June 29, 1922. Serial No. 571,712.

*To all whom it may concern:*

Be it known that I, WILLIS S. BARNES, a citizen of the United States, residing at Los Angeles, in the county of Los Angeles and State of California, have invented new and useful Improvements in Animal Traps, of which the following is a specification.

This invention relates to animal traps and has for its object to provide a device of large capacity for effectively inducing and retaining animals that have been attracted into the interior of the trap.

Another object of the invention is to provide a trap of the type involving an animal set trapping gate or door.

Another object is to provide a trap wherein the operating mechanism is effectively protected so that it cannot be destroyed or injured by the trapped rodents.

Another object is to provide a trap having an entrance and bait room and separate from which is a trap chamber or room to contain the trapped animals wherein they are prevented from returning to the bait chamber.

An object is to provide means operated by the trapped animal to reset the trap door as the animal passes from the bait room to the final cage room.

Other objects and advantages of the invention will be made manifest in the following specification of an embodiment of the invention illustrated in the accompanying drawings, wherein.

Figure 1:
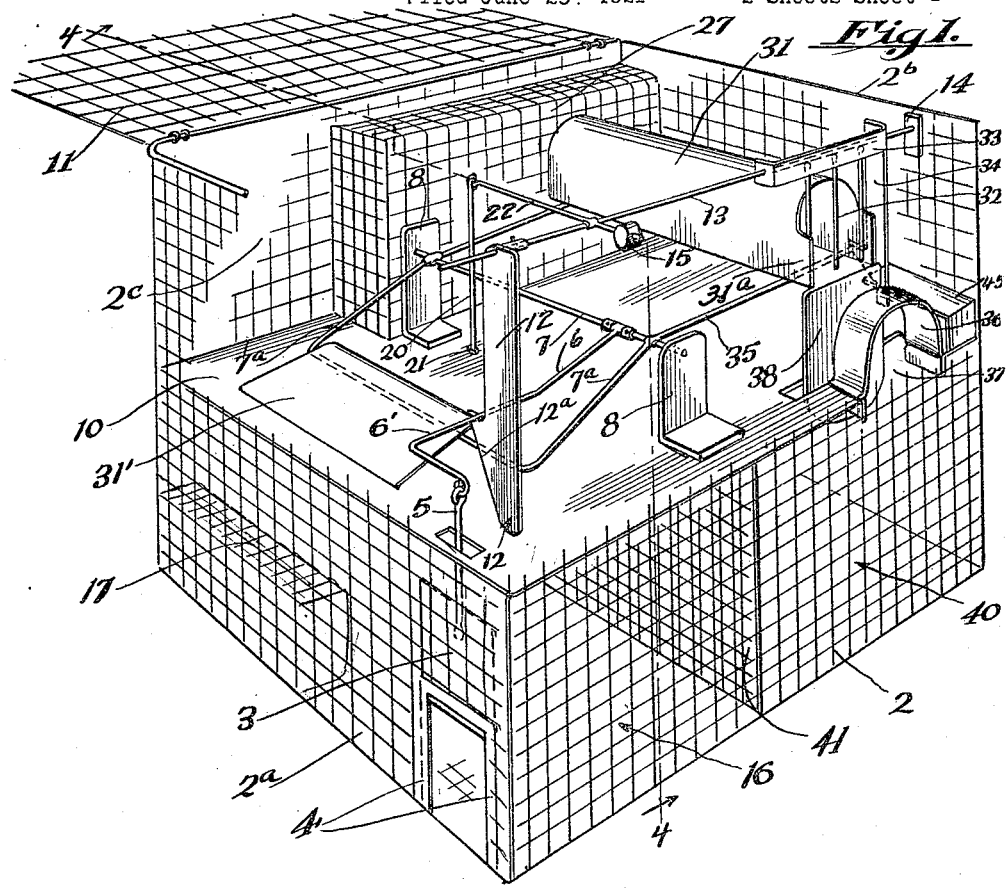
Figure 1 is a perspective of the trap showing its cover lifted to the open position, and the walls of the trap being broken away to show clearly the mechanism thereof.

The trap may be erected of any suitable material preferably of reticulated substantial wire walls 2. The box can be practically formed of one continuous piece forming a rectangular chamber of four walls of suitable height. One wall as $2^a$ is provided with a trap door 3 movable in suitable guides along a doorway 4 preferably in one corner of the trap chamber and the door is connected by an upwardly extending link 5 to a lever arm 6 which is fulcrumed at one end as on a shaft 7 mounted in bearings 8 provided on an intermediate floor 10 between the bottom of the chamber and the open top thereof.

The open top is provided with a hinged cover 11 adapted to be closed down over the top of the walls of the trap. The trap door 3 is adapted to be latched in its open or set position as by means of a latch member or hook 12 which is secured on a rock shaft 13 extending along the top of the upper compartment and is supported in suitable bearings 14 which may be provided on the end walls $2^a$ and $2^b$.

While the latch hook 12 may operate by gravity to engage the uplifted lever arm 6 of the door 3, the shaft may be overbalanced as by a poise 15 attached thereto and tending to swing the latch hook 12 to its locking position. The latch hook is provided with an inclined face $12^a$ constantly pressing against the lever arm 6 when the door is lowered so that when the door is raised, the latch hook 12 instantly becomes effective to lock the door in its upper position.

An animal entering through the doorway 4 turns in the bait room 16, being attracted by bait contained in a bait pocket and screen 17 which is arranged along the front wall $2^a$. The animal in endeavoring to find access to the bait traverses the bait room 16 and engages a pedal 18 projecting forwardly into the bait room and being pivoted at its rear end at 19. The swinging end of the pedal 18 is connected to a link 20 which extends up through an aperture 21 in the floor 10 and thence upwardly to a lever arm 22 which is fixedly connected to the rock shaft 13. As the weight of the animal is imposed on the pedal 18, this swings down and, by means of the link 20, pulls down the lever 22 and this rocks the shaft 13 and disengages the nib of the hook 12 from the door lever 6 thus releasing the lever and permitting the door to fall and thus entrap the animal in the bait room.

Egress being prevented from the bait room by the closed door, the entrapped animal then seeks other means of exit and this is provided by an opening 25 leading up through the floor 10 into a narrow passageway 26 extending along the side wall $2^c$; this passageway being formed by an inner partition 27 and by an upwardly inclined runway 28. At the top of the runway is a short platform 29 and adjacent to this there is formed in the partition 27 an opening 30. This leads into a tunnel 31 preferably of imperforate material and thus being darkened in its interior.

The tunnel 31 is of such diameter as to permit the entrance and passage of a rodent but prevents the animal from doubling its tracks through the tunnel. The tunnel is adapted for movement from the plane of the platform 29 downwardly, under the weight of the animal therein.

Figure 2:
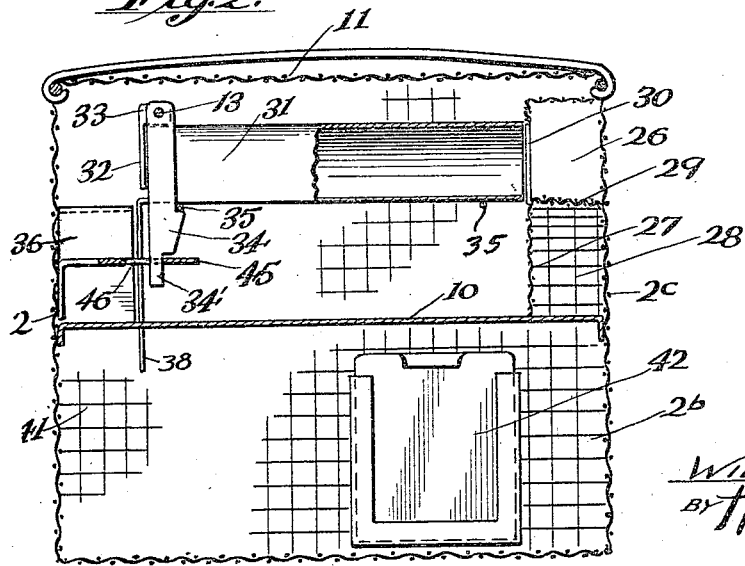
Figure 2 is a transverse section on line 2—2 of Figure 3.
Figure 3:
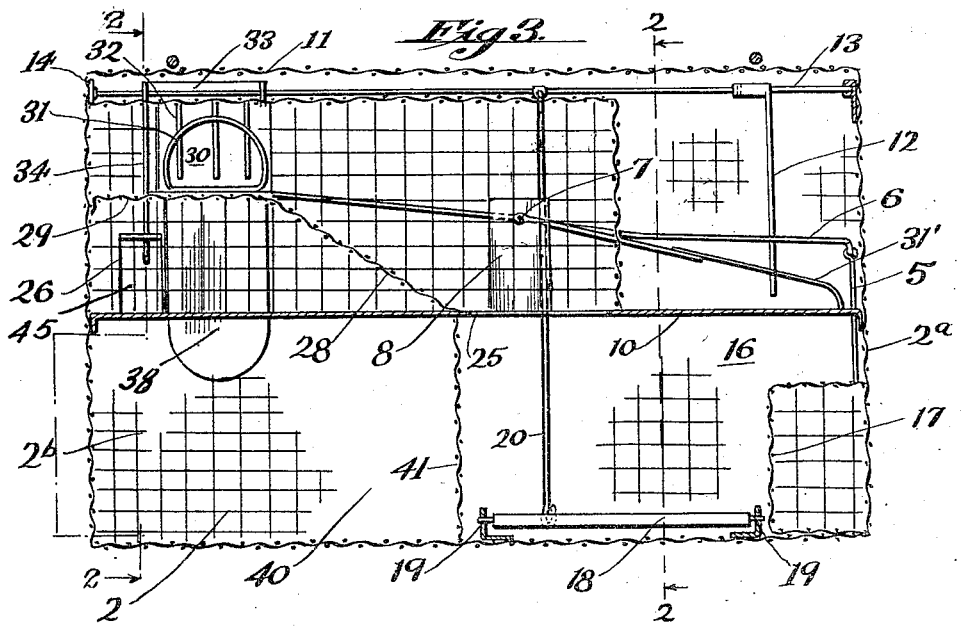
Figure 3 is a longitudinal section through the trap on line 3—3 of Figure 4.
Figure 4:
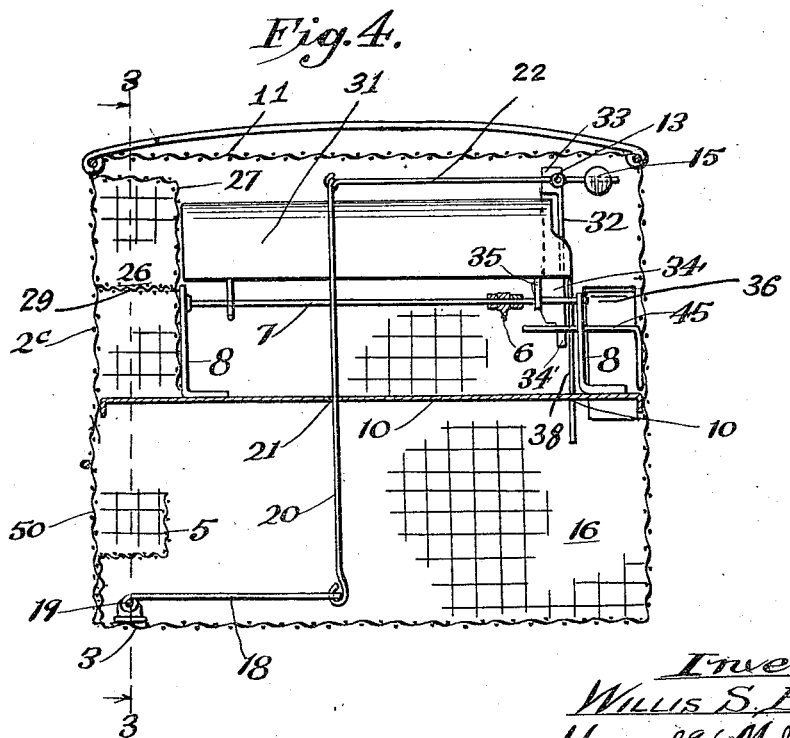
Figure 4 is a transverse section of the trap on line 4—4 of Figure 1.

Egress from the tunnel 31 is prevented by a barrier of a form which does not exclude the entrance of light to the tunnel and this barrier further forms means for controlling the vertical movement of the tunnel. The animal in seeing light ahead through the tunnel rushes along in the same until striking the barrier which is shown as including a set of downwardly extending bars 32 which are attached to a swinging member 33 swinging freely on the rock shaft 13. These bars stand close to the exit from the tunnel 31 and when engaged by the animal swinging outwardly. This action rocks the member 33 to which is connected a latch 34. This latch 34 engages a part rigid with the tunnel 31 and which part may consist of the adjacent end of a lever arm 35, of which there is a pair, secured to the rock shaft 7. The arms are secured to and carry the transversely extending tunnel 31 and the weight of this is suitably counterbalanced so that it will operate readily under the weight of the enclosed animal as soon as the latch 34 is retracted from the engaged part 35, Figure 2. Releasing the tunnel permits it to descend a suitable distance sufficiently to bring the tunnel exit into register with an arch 36 provided in the floor. The arch 36 covers an opening 37 in the floor and which opens into a final trapping chamber 40 which is divided from the bait room 16 by a transverse partition 41. It will be seen that the animal is lowered by the tunnel 31 to such position that it, the animal, may escape from the tunnel under the arch and through the opening 37 to the trap chamber 40. This is provided with an exit closure 42 which may be arranged in the end wall $2^b$.

To prevent an animal from again ascending under the arch 36, there is attached to the bottom of the tunnel a downwardly extending shield 38 lying close to the adjacent side of the arch and, therefore, forming a closure against the return of the entrapped rodents.

The tunnel 31 is approximately counterbalanced as by means of a weight 31′ which may be suitably attached to the rock shaft 7 as by lever arms $7^a$ which may be extensions of the lever arms 35 or of other suitable construction and arrangement.

The operation is as follows: A rat after entering the doorway 4 will engage the pedal 18 and this will pull down the lever arm 22 and retract the latch hook 12 and release the door lever 6 which will descend and lower the door. In its lower position the door lever 6 rests upon a contiguous part of the lever arm $7^a$ of the rock shaft 7.

Passing upwardly through the escape hole 25 from the bait room 16 the animal then enters the passageway 26 and turns into the tunnel 31. This will remain stationary until the animal reaches the barrier 32 and when this is actuated, it releases the latch member 34 which unlocks the tunnel 31 and allows the latter to descend carrying with it the enclosed rodent. The descent of the tunnel 31 acts through the lever arm $7^a$ to lift the trap door lever 6 and thereby cause it to be again latched by the hook 12 which holds it in elevated position in readiness for the entry of another rodent.

The animal cannot escape from the tunnel because of the limitation of the movement of the barrier 32; this limitation being secured by any stop means, as, for instance, a bracket 45 having a slot 46 in which the end 34′ of the lever 34 plays for limited movement just sufficient to disengage the tunnel member or part 35. The tunnel having lowered the animal to register with the arch 36, it then escapes downwardly through the opening 37 into the trap chamber 40 and the tunnel, as soon as free from the weight of the animal, rises under the action of its weight 31′ and becomes locked again by the latch 34.

It will be seen that a considerable number of the rats can be trapped in the chamber 40 and prevented from returning from the bait room and this leaves the bait room clear for the entrance of other animals. Animals outside of the trap seem to be instinctively attracted as much by the animals inside as by the bait and the open doorway entices the animals to readily enter the bait room and therefore be caught therein.

For the purpose of replenishing bait in the bait pocket 17, the wall $2^c$ may be provided with a hinged or other door 50 uncovering the end of the pocket 17 when the door is open. This door may, if desired, be provided with a bait basket 51.

From the above it will be seen that I have provided a trap of simple and substantial construction and of considerable capacity in proportion to the dimensions thereof.

The tunnel 31 has extending end portions $31^a$ between which the gate bars 32 hang.

Further embodiments, modifications and changes may be resorted to within the spirit of the invention as here claimed.

What is claimed is:

1. An animal trap comprising a bait room, a trap door for the bait room and which is automatically released by the animal in the bait room, a trapping chamber separate from the bait room, a passageway leading from the bait room to the trapping chamber, and means leading from the passageway to the bait room and including a tunnel operatively mounted to reset the trap door in open position by the weight of the animal passing to the trapping chamber, and an animal tripped gate at the outlet of the tunnel for releasing the latter.

2. An animal trap comprising a bait room, a trap door for the bait room and which is automatically released by the animal in the bait room, a trapping chamber separate from the bait room, a passageway leading from the bait room to the trapping chamber, means leading from the passageway to the chamber and including a tunnel operatively mounted to reset the trap door in open position by the weight of the animal passing to the trapping chamber, and means for locking the tunnel in a position registering with the said passageway.

3. An animal trap comprising a bait room, a trap door for the bait room and which is automatically released by the animal in the bait room, a trapping chamber separate from the bait room, a passageway leading from the bait room to the trapping chamber, means leading from the passageway to the chamber and including a tunnel operatively mounted to reset the trap door in open position by the weight of the animal passing to the trapping chamber, and means for locking the tunnel in a position registering with the said passageway and which prevents the exit of the animal from the tunnel until the tunnel has registered with an inlet to the trapping chamber.

In testimony whereof I have signed my name to this specification.

WILLIS S. BARNES.